(12) United States Patent
Wei et al.

(10) Patent No.: US 8,279,380 B2
(45) Date of Patent: Oct. 2, 2012

(54) LIQUID CRYSTAL DISPLAY WITH COLOR LIGHT GUIDE PANEL

(75) Inventors: Pei-Kuen Wei, Taipei (TW); Yeong-Der Yao, Taipei (TW); Da-Hua Wei, Taipei (TW); Shen-Yu Hsu, Taipei (TW); Kai-Wen Cheng, Taipei (TW); Tzu-Pin Lin, Tainan (TW); Chi-Neng Mo, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 13/451,800

(22) Filed: Apr. 20, 2012

(65) Prior Publication Data
US 2012/0200807 A1    Aug. 9, 2012

Related U.S. Application Data

(62) Division of application No. 12/315,127, filed on Nov. 26, 2008, now Pat. No. 8,186,865.

(30) Foreign Application Priority Data

Jun. 30, 2008    (TW) ................................ 97124571 A

(51) Int. Cl.
*G02F 1/1335* (2006.01)

(52) U.S. Cl. ........................................................ 349/106
(58) Field of Classification Search ................... 349/106
See application file for complete search history.

(56) References Cited

U.S. PATENT DOCUMENTS
2009/0185113 A1*    7/2009    Chung .......................... 349/106
\* cited by examiner

*Primary Examiner* — Nathanael R Briggs
(74) *Attorney, Agent, or Firm* — J.C. Patents

(57) ABSTRACT

An LCD including a backlight module and an LCD panel is provided. The LCD panel includes a color light guide panel, suitable for differentiating an incident light into multiple color lights. The color light guide panel includes a substrate and a color light output structure. The substrate has multiple pixel regions, and the color light output structure is disposed in each of the pixel regions. The color light output structure includes first~fourth nano-patterns. The incident light is scattered by the first nano-pattern for producing a first color light, scattered by the second nano-pattern for producing a second color light, scattered by the third nano-pattern for producing a third color light, and scattered by the fourth nano-pattern for producing a fourth color light. The color light guide panel can output uniform and high luminous first~fourth color light, and the LCD can display high quality image.

12 Claims, 7 Drawing Sheets

LIQUID CRYSTAL DISPLAY WITH COLOR LIGHT GUIDE PANEL

CROSS-REFERENCE TO RELATED APPLICATION

This application is a divisional application of and claims the priority benefit of U.S. patent application Ser. No. 12/315,127, filed on Nov. 26, 2008, now pending, which claims the priority benefit of Taiwan application serial no. 97124571, filed Jun. 30, 2008. The entirety of each of the above-mentioned patent applications is hereby incorporated by reference herein and made a part of this specification.

BACKGROUND OF THE INVENTION

1. Field of the Invention

The present invention relates to a light guide panel and a display device. More particularly, the present invention relates to a color light guide panel and a liquid crystal display (LCD) having a color light output structure.

2. Description of Related Art

With development of the photoelectric technology and the semiconductor technology, flat panel displays (FPD) such as LCDs gradually become popular in the market. Generally, the LCD includes a backlight module and an LCD panel, wherein the LCD panel is composed of a thin-film transistor array substrate, a color filter substrate and a liquid crystal layer disposed there between.

In case that the conventional color filter substrate is applied, each single pixel is composed of three sub-pixels, and a thin-film transistor is utilized for each of the sub-pixels to control intensity of light passing through the sub-pixel. The light passing through the sub-pixels is modulated by color filter patterns (red, green and blue) corresponding to the sub-pixels, so as to mix the original colors of the sub-pixels to be a color of the pixel. Accordingly, after the light passes through the color filter substrate, a luminance thereof is decreased. Moreover, material cost of the color filter substrate occupies about 15% of that of the LCD panel, and a relatively long time is required to fabricate the color filter substrate. Therefore, based on the conventional technique, an LCD without the color filter substrate is developed.

U.S. Pat. No. 6,480,247 provides a color display device without applying the color filter substrate. According to FIG. 1 of the U.S. Pat. No. 6,480,247, a field sequential color (FSC) technique is disclosed, by which three primary color (red, green and blue) light sources are timingly switched, and transmissivity of the liquid crystal pixel is synchronously controlled during displaying of each color light source, so as to adjust a relative light amount of each primary color. Next, based on a visual staying principle, the color is perceived by human eyes. Namely, the conventional method of mixing colors on a spatial axis now can be substituted by mixing colors on a time axis, i.e. swiftly switching the R, G and B primary colors. If a switching time thereof is less than a time that can be perceived by human eyes, a mixing color effect is then achieved based on the visual staying principle of human eyes. However, in such technique, a response speed of the liquid crystal and color separation control are essential. Generally, if the response speed of the liquid crystal is not quick enough, it can be an obstacle for the color sequential technique. Moreover, to improve the color separation, a complicated control algorithm and a powerful circuit driving capability are required, so that it is hard to be implemented.

On the other hand, U.S. Pat. No. 7,164,454 provides a technique of applying a RGB LED backlight module to avoid utilization of the color filter substrate. According to FIG. 2 of the U.S. Pat. No. 7,164,454, by fabricating transparent gratings on a light guide panel, an incident light can be diffracted by the gratings. Since first-order diffraction angles formed by different wavelengths are different, light with different wavelengths can be focused at different positions on a diffusion plate via a micro-lens array, so as to achieve the RGB color separation effect. However, since requirement for alignment accuracy of the transparent gratings and the pixels is relatively high, it is hard to be fabricated.

SUMMARY OF THE INVENTION

The present invention is directed to an LCD including a color light output structure for outputting high luminance full color images.

The present invention provides an LCD including a backlight module, an LCD panel and a color light output structure. The backlight module provides an incident light. The LCD panel is disposed above the backlight module and includes an active device array substrate, an opposite substrate and a liquid crystal panel. The opposite substrate is disposed opposite to the active device array substrate. The liquid crystal layer is disposed between the active device array substrate and the opposite substrate. The color light output structure is disposed on the active device array substrate or the opposite substrate to differentiate the incident light into multiple color lights. The color light output structure includes a first nano-pattern, a second nano-pattern and a third nano-pattern. The incident light is scattered by the first nano-pattern for producing a first color light, scattered by the second nano-pattern for producing a second color light, and scattered by the third nano-pattern for producing a third color light. The color light output structure further includes a fourth nano-pattern, and the incident light is scattered by the fourth nano-pattern for producing a fourth color light. The fourth nano-pattern includes a plurality of nano particles, and diameter of the nano particle is between 3-250 nanometers. A space between the nano particles of the fourth nano-pattern is Dd or a multiple of Dd, wherein Dd is 600 nanometers±30 nanometers, and the color of the fourth color light is yellow.

In an embodiment of the present invention, the first nano-pattern, the second nano-pattern and the third nano-pattern respectively include a plurality of nano particles, wherein diameter of the nano particle is between 3-250 nanometers.

In an embodiment of the present invention, a space between the nano particles of the first nano-pattern is Da or a multiple of Da, wherein Da is 650 nanometers±30 nanometers, and the color of the first color light is red.

In an embodiment of the present invention, a space between the nano particles of the second nano-pattern is Db or a multiple of Db, wherein Db is 550 nanometers±30 nanometers, and the color of the second color light is green.

In an embodiment of the present invention, a space between the nano particles of the third nano-pattern is Dc or a multiple of Dc, wherein Dc is 450 nanometers±30 nanometers, and the color of the third color light is blue.

In an embodiment of the present invention, material of the nano particles includes organic materials or inorganic materials, wherein the organic material includes polystyrene, polymethylemethacrylate or photopolymer, and the inorganic material includes metal, alloy, insulating materials or semiconductor.

In an embodiment of the present invention, shape of the nano particle includes triangle, polygon or circle.

In an embodiment of the present invention, the active device array substrate includes a substrate, an active device array and a pixel electrode layer. The substrate has a plurality of pixel regions. The active device array is disposed on the substrate. The pixel electrode layer and the active device array are electrically connected, wherein if the color light output structure is disposed on the active device array substrate, the color light output structure is disposed on the substrate or on the pixel electrode layer while corresponding to each of the pixel regions.

Since the color light output structure having the first, the second and the third nano-patterns is applied, and the color light output structure can be disposed on the light guide panel, the active device array substrate or the opposite substrate for differentiating the incident light into multiple color lights, the conventional color filter substrate is unnecessary, so that fabrication cost is reduced. Moreover, the primary colors can be individually obtained by controlling the shape, size and arrangement period of the nano particles, so as to achieve a full color display effect.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
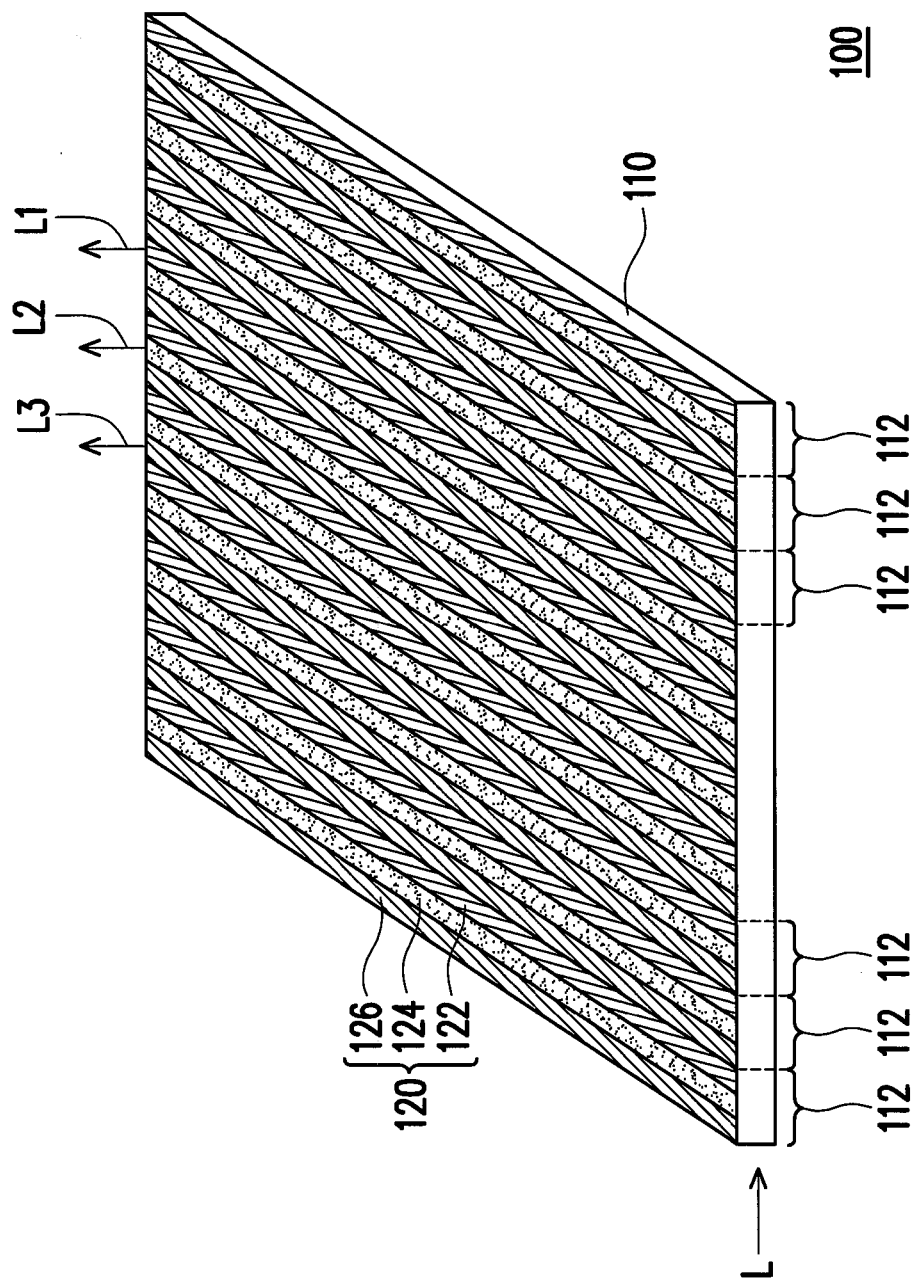
FIG. 1 is a schematic diagram illustrating a color light guide panel according to a preferred embodiment of the present invention.

FIG. 1 is a schematic diagram illustrating a color light guide panel according to a preferred embodiment of the present invention. Referring to FIG. 1, the color light guide panel 100 is suitable for differentiating an incident light L into multiple color lights. The color light guide panel 100 includes a substrate 110 and a color light output structure 120. The substrate 110 has a plurality of pixel regions 112. The color light output structure 120 is disposed in each of the pixel regions 112. The color light output structure 120 includes a first nano-pattern 122, a second nano-pattern 124 and a third nano-pattern 126. The incident light L is scattered by the first nano-pattern 122 for producing a first color light L1, scattered by the second nano-pattern 124 for producing a second color light L2, and scattered by the third nano-pattern 126 for producing a third color light L3.

Referring to FIG. 1 again, material of the substrate 110 can be glass or transparent resin, wherein the transparent resin can be acryl or polymethylmethacrylate (PMMA), etc. It should be noted that since the first nano-pattern 122, the second nano-pattern 124 and the third nano-pattern 126 are in nanoscale, they have special optical characteristics. In detail, the incident light L may has a high scattering phenomenon and a surface plasmon resonance phenomenon while passing through the first nano-pattern 122, the second nano-pattern 124 and the third nano-pattern 126. Therefore, the incident light L can be scattered to produce the first color light L1, the second color light L2 and the third color light L3 with high luminance and different wavelengths (i.e. different colors). Detailed description thereof is made in the following content.

Figure 2:
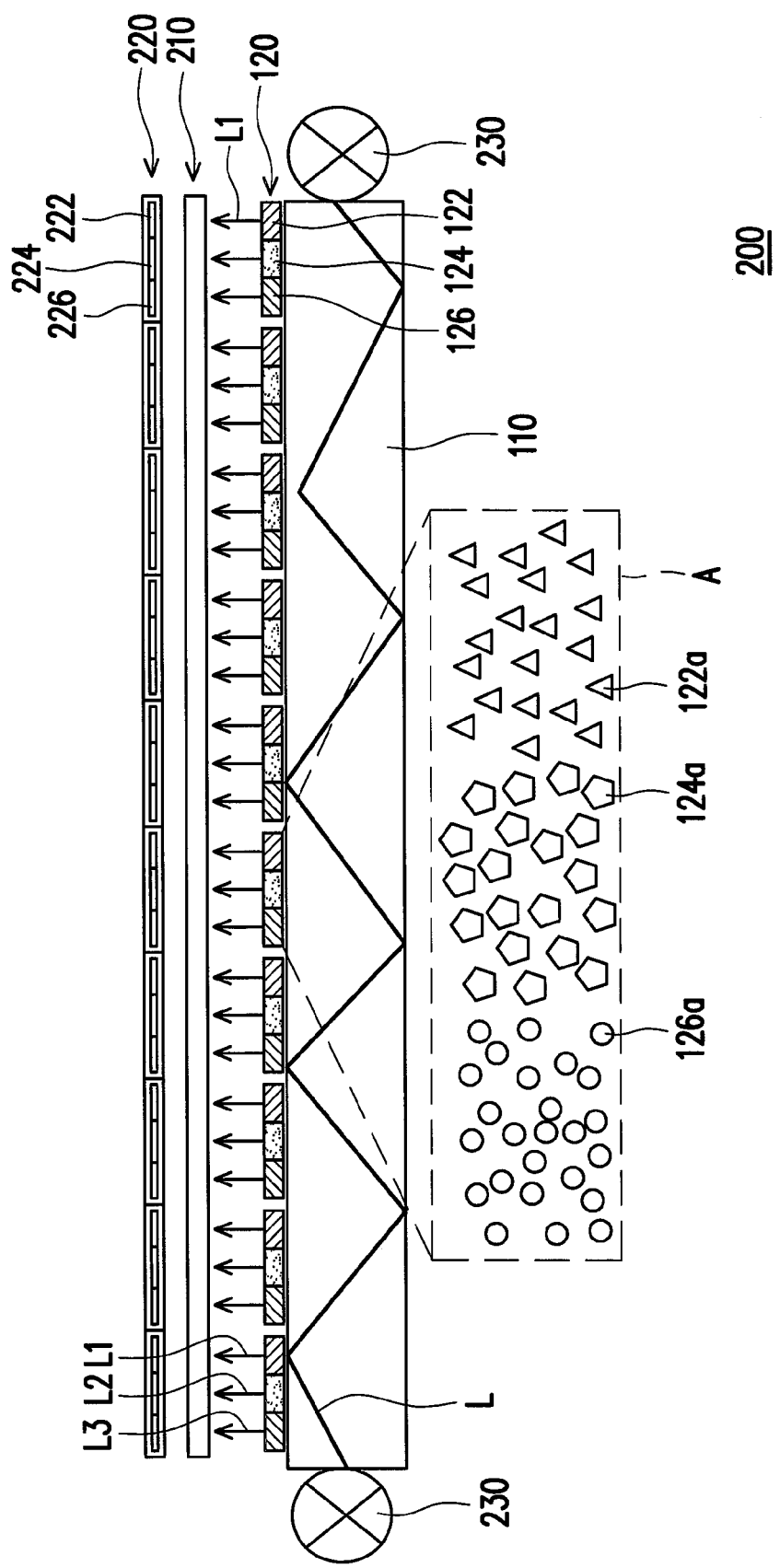
FIG. 2 is a schematic diagram illustrating a backlight module according to a preferred embodiment of the present invention.

FIG. 2 is a schematic diagram illustrating a backlight module according to a preferred embodiment of the present invention. In FIG. 2, a diffusion plate 210 and an active device array substrate 220 above the backlight module 200 are also illustrated for clearly presenting a corresponding relation respectively between the first nano-pattern 122, the second nano-pattern 124 and the third nano-pattern 126 of the color light guide panel 100 and sub-pixels 222, 224 and 226 of the active device array substrate 220.

Referring to FIG. 2 again, the backlight module 200 includes a light source 230. The light source 230 is for example, a white light emitting diode (LED) array or a cold cathode fluorescent lamp (CCFL), which is suitable for providing the incident light L. It should be noted that shown as an amplified diagram of a region A, the first nano-pattern 122, the second nano-pattern 124 and the third nano-pattern 126 respectively may include a plurality of nano particles 122a, 124a and 126a. Diameters of the nano particles 122a, 124a and 126a are between 3 nm~250 nm. Moreover, the material of the nano particles 122a, 124a and 126a may be organic materials or inorganic materials, wherein the organic material may include polystyrene, polymethylemethacrylate or photopolymer, and the inorganic material may include metal, alloy, insulating materials or semiconductor, wherein the metal can be gold or silver.

The nano particles 122a, 124a and 126a have two special optical characteristics. One is the relatively high optical scattering capability, and the other one is the surface plasmon resonance phenomenon with the incident light. Only the light with a wavelength satisfying the resonance condition can be scattered out. Regarding the optical scattering capability of the nano particles 122a, 124a and 126a, if the nano particles 122a, 124a and 126a are nano metal balls, a scattering cross-sectional area $C_{sca}(\omega)$ thereof can be represented by an equation (1):

$$C_{sca}(\omega) = 4\pi r^2 \times \frac{32}{3}\pi^4 \left(\frac{r}{\lambda}\right)^4 \varepsilon_m^2 \frac{[\varepsilon_p'(\omega) - \varepsilon_m]^2 + \varepsilon_p''^2(\omega)}{[\varepsilon_p'(\omega) + 2\varepsilon_m]^2 + \varepsilon_p''^2(\omega)} \quad (1)$$

wherein r is radius of the nano metal ball, $\lambda$ is the wavelength of the incident light, $\in_m$ is the dielectric coefficient of the air, $\in_p$ is the dielectric coefficient of the nano-metal ball, $\in'_p$ is the real part of the dielectric coefficient $\in_p$ of the nano metal ball, $\in''_p$ is an imaginary part of the dielectric coefficient $\in_p$ of the nano metal ball, $\omega=2\pi f$, and f is a frequency of the incident light.

Particularly, the dielectric coefficient $\in_p$ of the nano metal ball is a negative value, and the value of the $\in_p$ relates to the wavelength of the incident light, and the size and the shape of the nano metal ball. In case of a specific wavelength, if the dielectric coefficient of the nano metal ball is −2, the denominator of the equation (1) is then near zero, and therefore the value of the scattering cross-sectional area $C_{sca}(\omega)$ is rather great, so that the nano metal ball may have a rather high light scattering capability. Compared to the light scattering capability of the transparent ball having the same size (the dielectric coefficient $\in_p$ thereof is a positive value), the light scattering capability of the nano metal ball is about 2-3 orders of magnitude higher.

Namely, luminance of the output first color light L1, the second color light L2 and the third color light L3 can be improved via the first nano-pattern 122, the second nano-pattern 124 and the third nano-pattern 126 respectively having the nano particles 122a, 124a and 126a.

Figure 3:
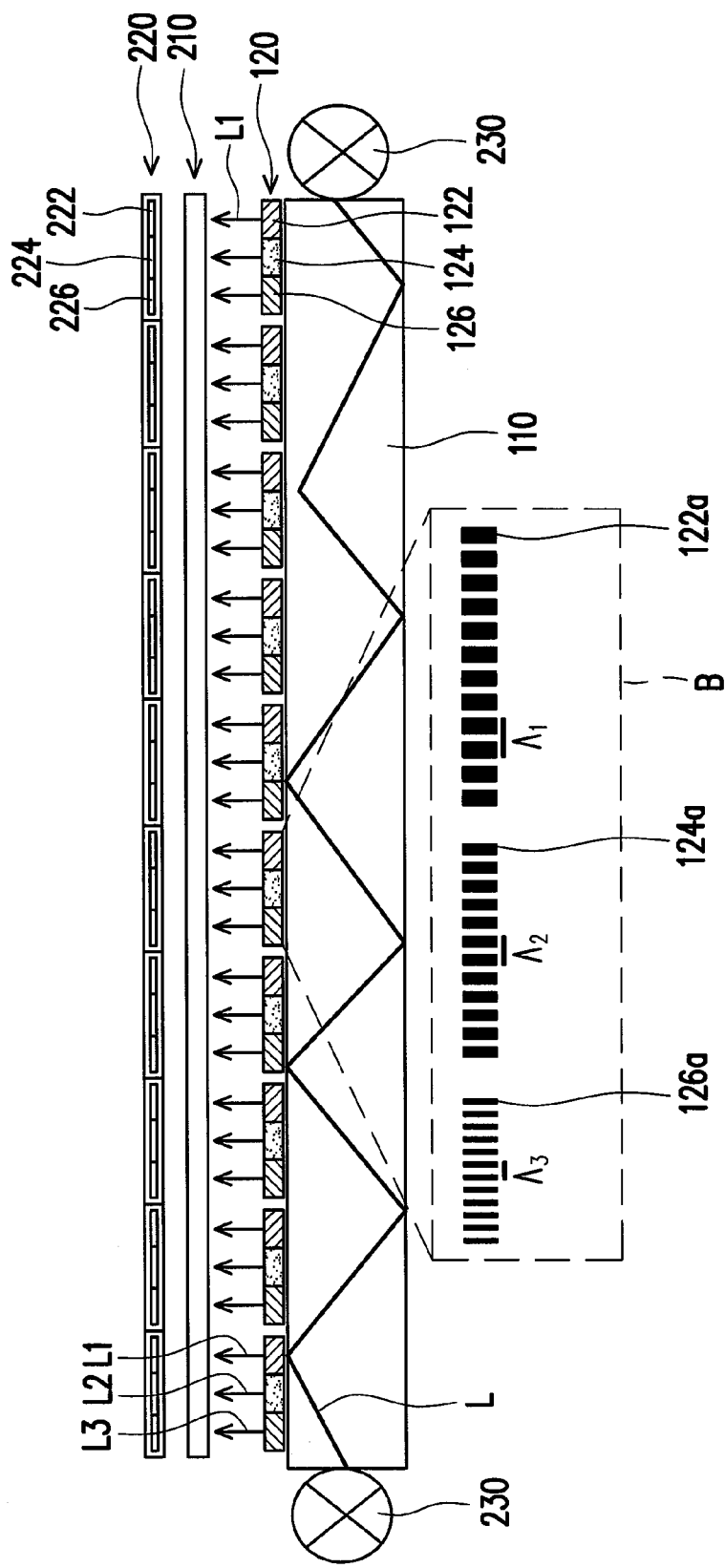
FIG. 3 is a schematic diagram illustrating another backlight module according to a preferred embodiment of the present invention.

Moreover, the surface plasmon resonance phenomenon is occurred between the nano particles 122a, 124a and 126a and the incident light L, so that only the light with a wavelength satisfying the resonance condition can be scattered out. FIG. 3 is a schematic diagram illustrating another backlight module according to a preferred embodiment of the present invention. The similar parts have been described with reference of FIG. 2, and therefore detailed description thereof will not be repeated. Referring to FIG. 2 and FIG. 3, the resonance condition of the surface plasmon can be changed by suitably controlling the size, shape, arrangement period, etc. of the nano particles 122a, 124a and 126a, so that only the light with a wavelength satisfying the resonance condition of the surface plasmon can be scattered out. First, referring to FIG. 2, shape of the nano particles 122a, 124a and 126a can be triangle, polygon, circle or other suitable shapes, so as to scatter the red light, the green light and the blue light.

Particularly, referring to FIG. 3, shown as the amplified diagram of a region B, regarding the arrangement period, a space $\Lambda_1$ between the particles 122a of the first nano-pattern 122 is Da or a multiple of Da, wherein Da is 650 nanometers±30 nanometers (i.e. 620 nm~680 nm), and the color of the first color light L1 is red; a space $\Lambda_2$ between the nano particles 124a of the second nano-pattern 124 is Db or a multiple of Db, wherein Db is 550 nanometers±30 nanometers (i.e. 520 nm~580 nm), and the color of the second color light L2 is green; a space $\Lambda_3$ between the nano particles 126a of the third nano-pattern 126 is Dc or a multiple of Dc, wherein Dc is 450 nanometers±30 nanometers (i.e. 420 nm~480 nm), and the color of the third color light L3 is blue. In detail, by changing spaces $\Lambda_1$, $\Lambda_2$ and $\Lambda_3$, the arrangement period of nano particles 122a, 124a and 126a will be changed accordingly so as to provide different color lights L1, L2 and L3.

Figure 4:
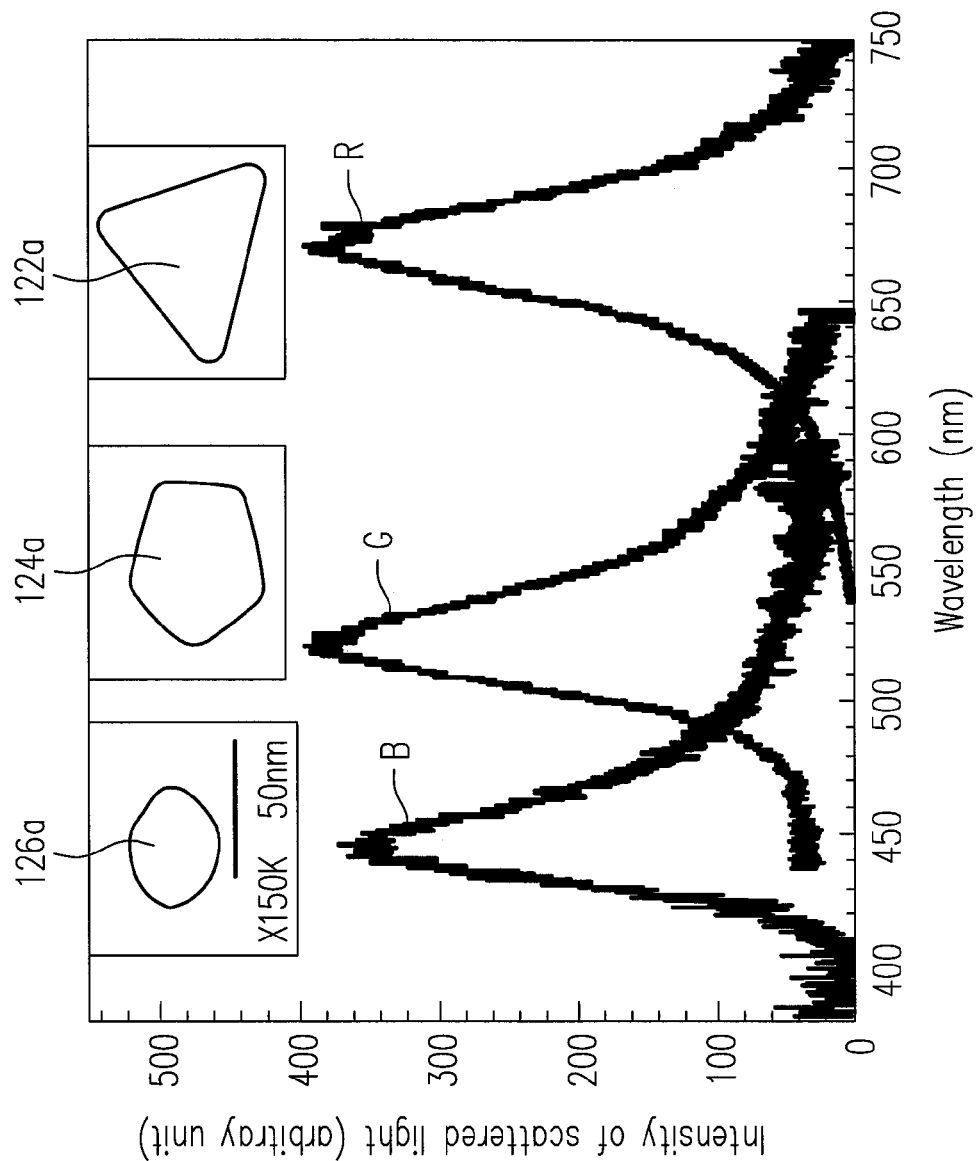
FIG. 4 is a spectrum diagram of lights with different wavelengths respectively scattered by different nano particles.

FIG. 4 is a spectrum diagram of lights with different wavelengths respectively scattered by different nano particles. Referring to FIG. 4, it is obvious that the first color light L1 scattered by the nano particles 122a of the first nano-pattern 122 is red light, the second color light L2 scattered by the nano particles 124a of the second nano-pattern 124 is green light, and the third color light L3 scattered by the nano particles 126a of the third nano-pattern 126 is blue light. Accordingly, the RGB primary colors can be respectively scattered by applying the nano particles 122a, 124a and 126a with different shapes, sizes and arrangement periods.

Figure 5:
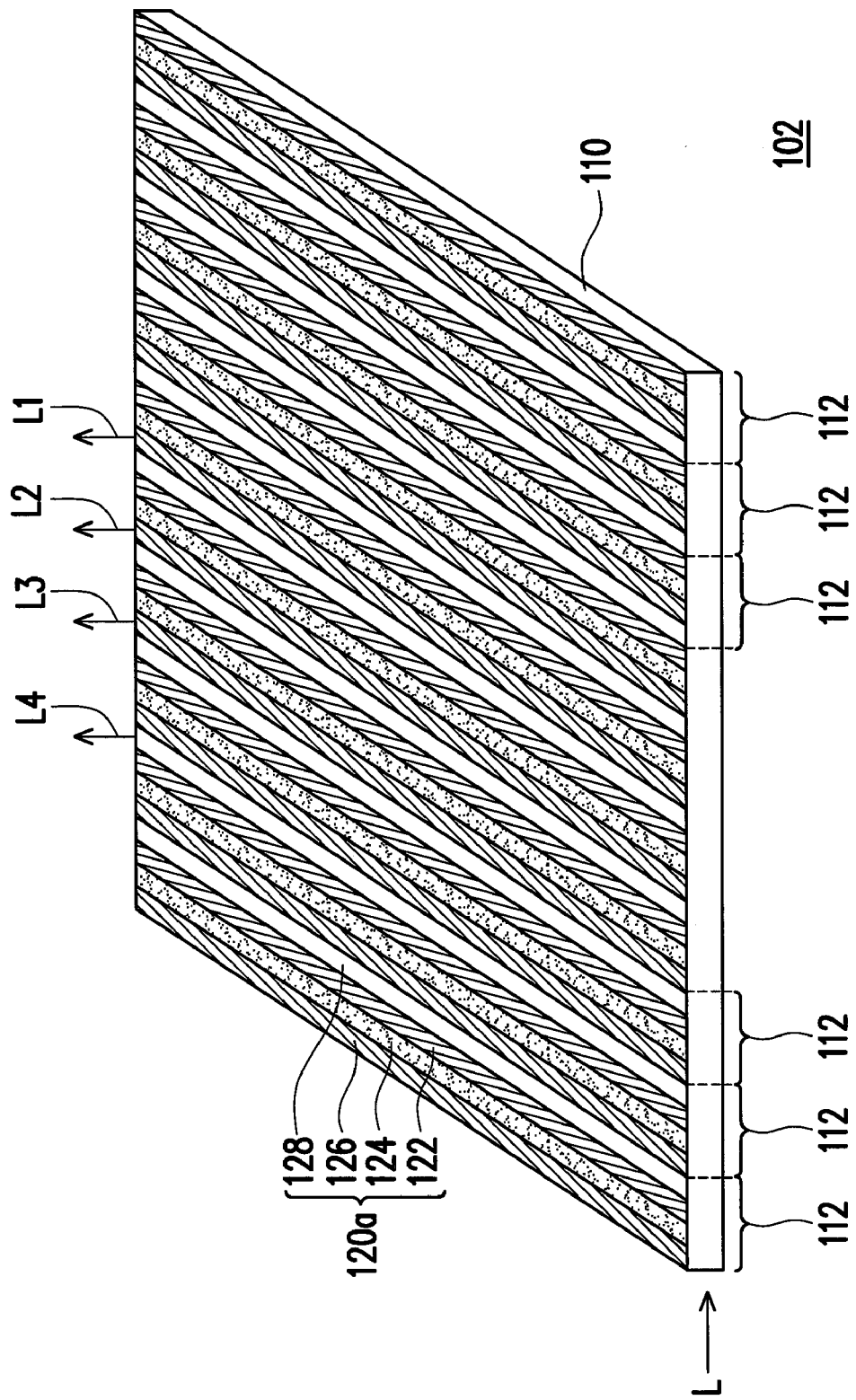
FIG. 5 is schematic diagram illustrating another color light guide panel according to a preferred embodiment of the present invention.

FIG. 5 is schematic diagram illustrating another color light guide panel according to a preferred embodiment of the present invention. The similar parts have been described with reference of FIG. 1, and therefore detailed description thereof will not be repeated. In the color light guide panel 102, based on the same principle, the color light output structure 120a may further includes a fourth nano-pattern 128, and the incident light L is scattered by the fourth nano-pattern 128 for producing a fourth color light L4. The fourth nano-pattern 128 includes a plurality of nano particles 128a, and diameter of the nano particle is between 3-250 nanometers. Particularly, a space $\Lambda_4$ between the nano particles 128a of the fourth nano-pattern 128 is Dd or a multiple of Dd, wherein Dd is 600 nanometers±30 nanometers (i.e. 570 nm~630 nm), and the color of the fourth color light L4 is yellow. Certainly, number and color combinations of the nano-patterns 122, 124, 126 and 128 of the color light output structure 120a are not limited by the present invention.

Fabricating methods of the color light output structures 120 and 120a are described as below. First, a metal film (not shown) is first formed on the substrate 110 via an electron beam evaporation process. Next, a photoresist layer (not shown) is coated on the metal film. And then, patterns with different arrangement periods are fabricated on the photoresist layer via an electronic lithography technique (such as, e-beam lithography). After that, the patterns with different arrangement periods on the photoresist layer is transformed to the metal film via a reactive ion etching process, so as to obtain the color light output structures 120 and 120a with the nano-patterns 122, 124, 126 and 128.

In the color light guide panels 100 and 102, the first color light L1, the second color light L2, the third color light L3 and the fourth color light L4 with high luminance can be output via the color light output structures 120 and 120a. Therefore, the color light guide panels 100 and 102 can be applied to a general LCD for outputting full color images. By such means, application of the color filter substrate is unnecessary, and the fabrication cost of the LCD can be reduced. Not only the color light guide panels 100 and 102 having the color light output structures 120 and 120a can be directly applied to the backlight module 200 for generating full color lights, but also the color light output structures 120 and 120a can be disposed in the LCD panel, and description thereof is as follows.

Figure 6A:
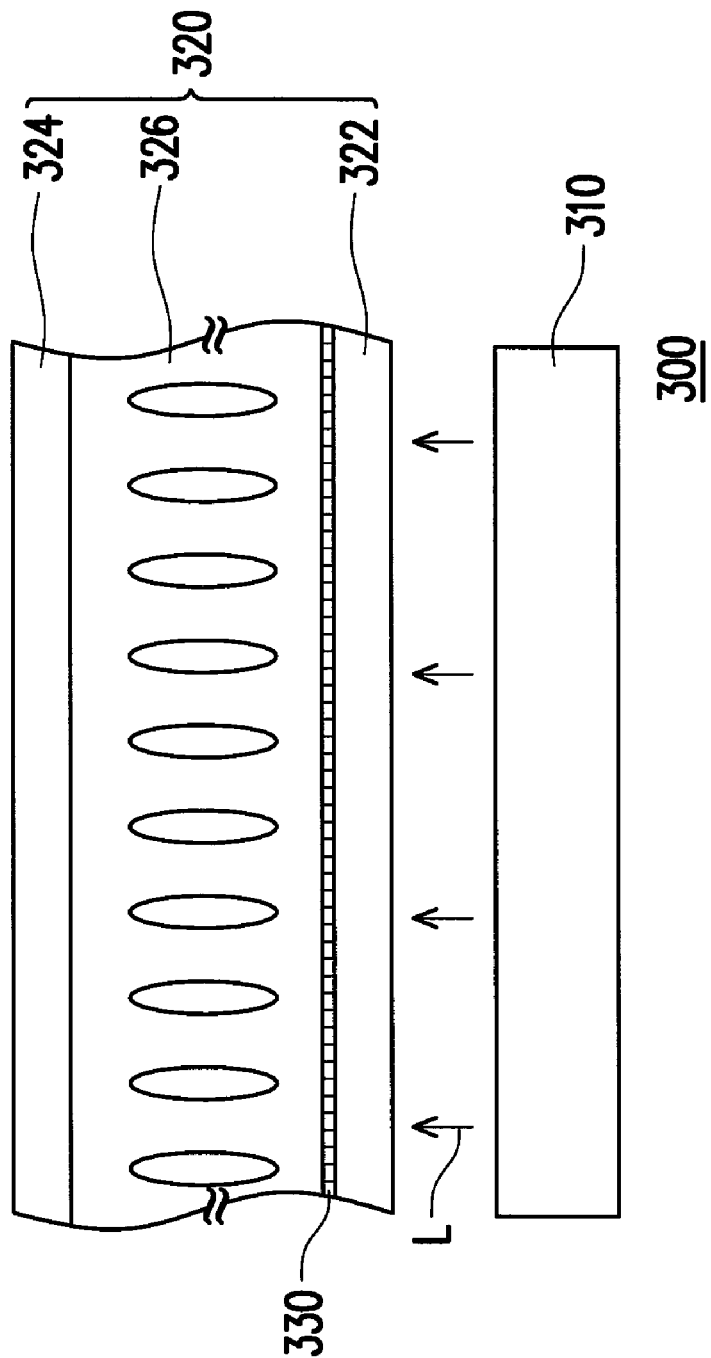
FIG. 6A and FIG. 6B are schematic diagrams of two LCDs according to a preferred embodiment of the present invention.
Figure 6B:
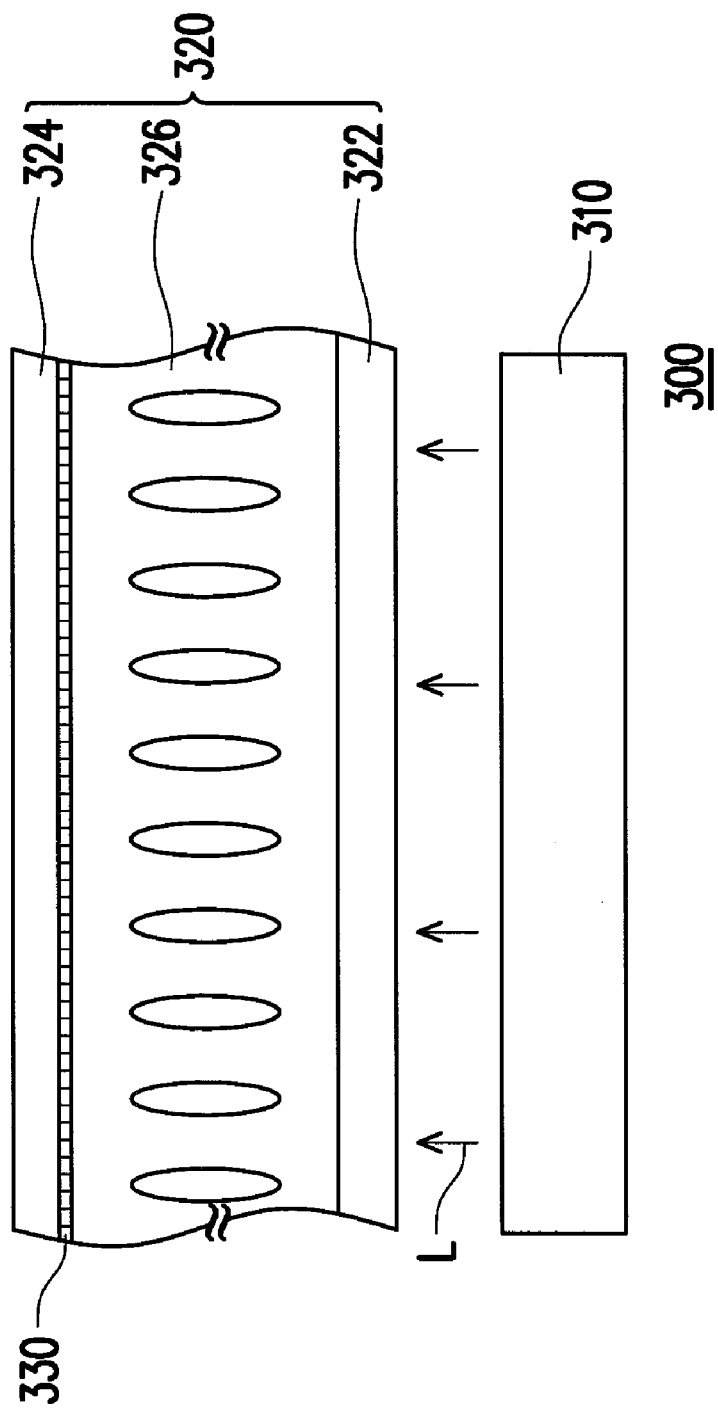

FIG. 6A and FIG. 6B are schematic diagrams of two LCDs according to a preferred embodiment of the present invention. Referring to FIG. 1, FIG. 6A and FIG. 6B, the LCD 300 includes a backlight module 310, an LCD panel 320 and a color light output structure 330. The backlight module 310 provides an incident light L. The LCD panel 320 is disposed above the backlight module 310, and includes an active device array substrate 322, an opposite substrate 324 and a liquid crystal layer 326. The opposite substrate 324 is disposed oppositely to the active device array substrate 322. The liquid crystal layer 326 is disposed between the active device array substrate 322 and the opposite substrate 324. The color light output structure 330 is disposed on the active device array substrate 322 (shown as FIG. 6A) or the opposite substrate 324 (shown as FIG. 6B) for differentiating the incident light L into multiple color lights. The color light output structure 330 can be the color light output structure 120 of FIG. 1 or the color light output structure 120a of FIG. 5, and detailed description thereof will not be repeated.

It should be noted that the color light output structure 330 can be disposed on various film layers of the LCD panel 320. The aforementioned active device array substrate 322 may include a substrate (not shown), an active device array (not shown) and a pixel electrode layer (not shown). The substrate has a plurality of pixel regions (not shown), and the active device array is disposed on the substrate. The pixel electrode layer and the active device array are electrically connected. Wherein, if the color light output structure 330 is disposed on the active device array substrate 322, the color light output structure 330 is disposed on the substrate or on the pixel electrode layer while corresponding to each of the pixel regions. Namely, the color light output structure 330 can be fabricated on the substrate, or on the pixel electrode layer.

Moreover, as shown in FIG. 6B, the color light output structure 330 can also be disposed on the opposite substrate 324 for differentiating the incident light L into the first color light L1, the second color light L2 and the third color light L3 (and/or the fourth color light L4) with relatively high luminance. Compared to the conventional color filter substrate fabricated based on the color resin, not only the luminance of the lights can be improved, but also fabrication process thereof can be simplified, and cost thereof can be reduced.

In summary, the color light guide panel and the LCD of the present invention have at least the following advantages.

By fabricating the color light output structure having the nano-patterns on the light guide panel, the active device array substrate or the opposite substrate, the incident light can be differentiated into multiple color lights, and application of the conventional color filter substrate fabricated based on resin is unnecessary. Particularly, individual primary color can be obtained by controlling the shape, size and arrangement period of the nano particles. Compared to the conventional FSC technique, the problems relate to response speed of the liquid crystal and color separation control can be avoided.

On the other hand, compared to the color filter substrate fabricated based on the transparent grating technique, an extra micro-lens array used for differentiating lights with different angles on a spatial axis is unnecessary. Particularly, obtaining of photons and formation of the RGB pixels are all integrated on the same light guide panel, so that an extra alignment problem can be avoided.

Moreover, relative intensities of the obtained RGB color lights can be adjusted via different process parameters, so as to uniform the luminance of the three primary color lights. The conventional technique of obtaining the relative intensities of the RGB color lights based on the single transparent grating technique cannot ensure uniformity of the luminance. Moreover, since the color filters are not required, the fabrication cost can be reduced, and extra transmission loss due to utilization of the color filters can be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An LCD, comprising:
    a backlight module, for providing an incident light; and
    an LCD panel, disposed above the backlight module, the LCD panel comprising:
        an active device array substrate;
        an opposite substrate, disposed oppositely to the active device array substrate; and
        a liquid crystal layer, disposed between the active device array substrate and the opposite substrate;
    a color light output structure, disposed on the active device array substrate or the opposite substrate for differentiating the incident light into multiple color lights, and the color light output structure comprising:
        a first nano-pattern, scattering the incident light for producing a first color light;
        a second nano-pattern, scattering the incident light for producing a second color light; and
        a third nano-pattern, scattering the incident light for producing a third color light,
    wherein the color light output structure further comprises a fourth nano-pattern, the incident light is scattered by the fourth nano-pattern for producing a fourth color light, and the fourth nano-pattern comprises a plurality of nano particles,
    wherein a space between the nano particles of the fourth nano-pattern is Dd or a multiple of Dd, wherein Dd is 600 nanometers±30 nanometers, and the color of the fourth color light is yellow.

2. The LCD as claimed in claim 1, wherein the first nano-pattern, the second nano-pattern and the third nano pattern respectively comprise a plurality of nano particles.

3. The LCD as claimed in claim 2, wherein diameter of the nano particle is between 3-250 nanometers.

4. The LCD as claimed in claim 2, wherein a space between the nano particles of the first nano-pattern is Da or a multiple of Da, wherein Da is 650 nanometers±30 nanometers, and the color of the first color light is red.

5. The LCD as claimed in claim 2, wherein a space between the nano particles of the second nano-pattern is Db or a multiple of Db, wherein Db is 550 nanometers±30 nanometers, and the color of the second color light is green.

6. The LCD as claimed in claim 2, wherein a space between the nano particles of the third nano-pattern is Dc or a multiple of Dc, wherein Dc is 450 nanometers±30 nanometers, and the color of the third color light is blue.

7. The LCD as claimed in claim 1, wherein diameter of the nano particle is between 3-250 nanometers.

8. The LCD as claimed in claim 2, wherein material of the nano particles comprises organic materials or inorganic materials.

9. The LCD as claimed in claim 8, wherein the organic material comprises polystyrene, polymethylemethacrylate or photopolymer.

10. The LCD as claimed in claim 8, wherein the inorganic material comprises metal, alloy, insulating materials or semiconductor.

11. The LCD as claimed in claim 2, wherein shape of the nano particle comprises triangle, polygon or circle.

12. The LCD as claimed in claim 1, wherein the active device array substrate comprises:
    a substrate, having a plurality of pixel regions;
    an active device array, disposed on the substrate; and
    a pixel electrode layer, electrically connected to the active device array,
    wherein if the color light output structure is disposed on the active device array substrate, the color light output structure is disposed on the substrate or on the pixel electrode layer while corresponding to each of the pixel regions.

* * * * *